United States Patent

[11] 3,623,509

[72] Inventors: Gerhard Sesseler, Ludwigsburg; Rainer Hoheisel, Kornwestheim; Heinz Walter, Ditzingen, all of Germany
[21] Appl. No. 883,931
[22] Filed Dec. 10, 1969
[45] Patented Nov. 30, 1971
[73] Assignee Robert Bosch GmbH, Stuttgart, Germany
[32] Priority Dec. 12, 1968
[33] Germany
[31] P 18 14 214.8

[54] CHECK VALVE CONTROLLING HYDRAULIC APPARATUS
10 Claims, 1 Drawing Fig.

[52] U.S. Cl. ............................................. 137/630.15, 91/26, 91/443, 137/513.5, 137/522, 251/25, 251/48, 251/63.5, 251/63.4
[51] Int. Cl. ............................................. F16k 15/18
[50] Field of Search ................................ 137/522, 630.15, 630.22, 513.5, 523; 91/25, 26, 443; 251/63.4, 63.5, 62, 63, 48

[56] References Cited
UNITED STATES PATENTS
1,591,671  7/1926  Flanders ....................... 91/443 X
2,382,457  8/1945  Wertman et al. ............. 91/26
FOREIGN PATENTS
216,400  7/1968  U.S.S.R. ...................... 137/630.15

Primary Examiner—Robert G. Nilson
Attorney—Michael S. Striker

ABSTRACT: A check valve means including a main check valve and an auxiliary check valve mounted on the main check valve, is slowly opened by first opening the auxiliary check valve and then opening the main check valve. The check valves are controlled by a piston which is at first slowly moved by a throttled flow of fluid to open the auxiliary check valve whereby a pressure surge in the conduit of the check valves is avoided. Thereupon, the piston opens a port through which a pressure fluid is supplied into the cylinder so that the piston is rapidly accelerated and fully opens the main check valve.

PATENTED NOV 30 1971
3,623,509
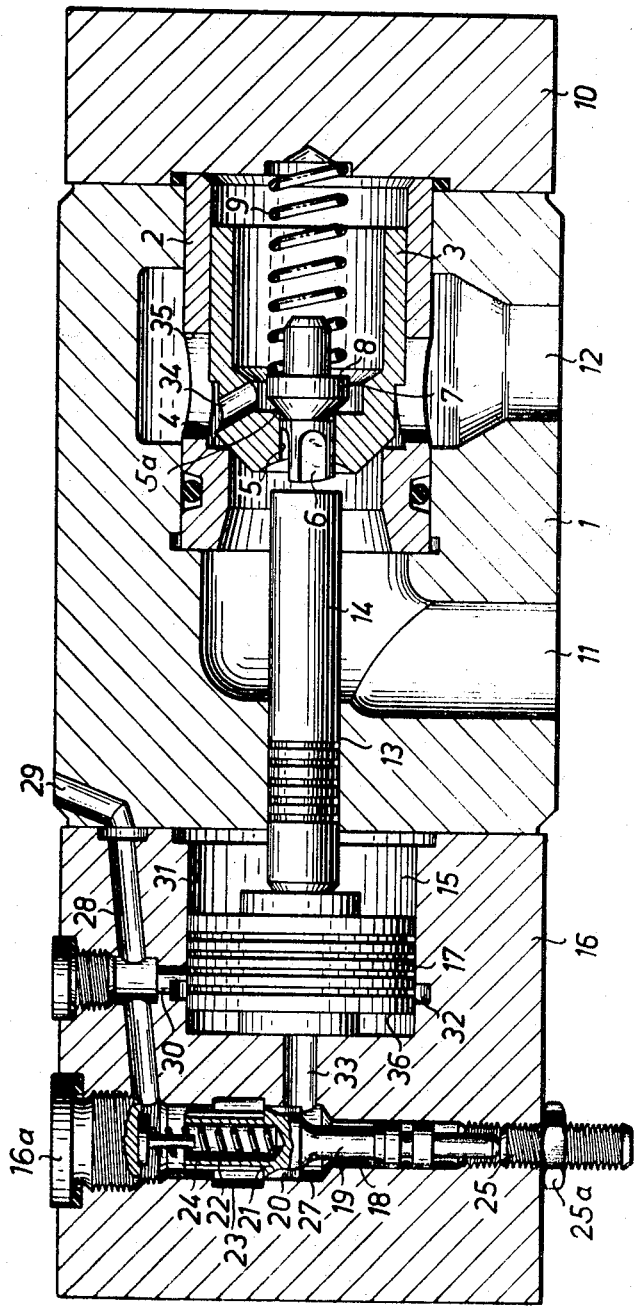
INVENTORS
Gerhard SESSELER
Rainer HOHEISEL
Heinz WALTER
By
their ATTORNEY

CHECK VALVE CONTROLLING HYDRAULIC APPARATUS

BACKGROUND OF THE INVENTION

Spring biassed check valves are known which normally close a conduit to permit flow only in one direction. It is also known to provide a hydraulic motor for opening the check valve to permit a reversed flow of fluid to the same. In known check valve controlling apparatus, the speed at which the check valve is opened can be adjusted, but the speed is the same for the entire movement of the check valve, resulting in an undesirably long time required for opening the check valve. It is not possible to increase the speed of opening of the check valve, since if the check valve is rapidly moved away from its seat at the beginning of the operation, a sudden pressure surge occurs which causes an impact of the fluid. Therefore, in accordance with the prior art, the check valve is slowly opened, and the slow speed required at the moment of opening is maintained for the entire opening movement of the check valve.

SUMMARY OF THE INVENTION

It is one object of the invention to overcome this disadvantage of known control apparatus for check valves, and to open a check valve at a varying speed.

Another object of the invention is to open a check valve at a low speed, and to further move the check in the open position at a high speed.

Another object of the invention is to first open a check valve by a piston operated at low pressure, and to then rapidly move the check valve in the open position by the piston subjected to higher pressure.

Another object of the invention is to provide a check valve means including a main check valve and an auxiliary check valve, and to first open the auxiliary check valve, and then open the main check valve by a piston subjected to different pressures.

With these objects in view, the flow of piston controlling pressure fluid is divided into a first flow which acts on the piston to open the check valve means, and a second flow which is controlled by the piston, and acts on the piston only after the check valve has been slightly opened.

One embodiment of the invention comprises a hydraulic motor including a cylinder and a piston connected with a check valve means for moving the same between closed and open positions, and control means communicating with the source of pressure fluid and including first and second conduit means opening into the cylinder.

The first conduit, which preferably includes a throttle, is connected with the cylinder for supplying a first small flow of pressure fluid into the same for operating the piston to move slowly from a normal position to a control position so that the check valve means is moved so slowly out of the closed position that the pressure surge cannot occur. Second conduit means also connect the pressure source with the cylinder at a port which is closed by the piston in the normal position of the same. In the control position of the piston, the port is opened, and a second large flow of fluid is supplied into the cylinder by which the piston is rapidly moved out of the control position into an end position so that the check valve means is moved rapidly to the fully opened position.

In the preferred embodiment of the invention, an adjustable throttle is provided in the first conduit means, and can be adjusted to vary the flow of pressure fluid to the cylinder by which the piston is operated to move the check valve away from its seat. By adjustment of the throttle, the initial speed of the piston and of the check valve can be adjusted.

In the preferred embodiment of the invention, the check valve means includes a main check valve and an auxiliary check valve mounted on the same and engaging a valve seat on the same under the action of a spring which biases both check valves to a closed position. The piston first opens the auxiliary check valve, and then, under the influence of the greater pressure produced by a flow through the second conduit, operates the main check valve to open the same.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing is a longitudinal sectional view illustrating a preferred embodiment of the invention.

DESCRIPTION OF THE PREFERRED EMBODIMENT

A supporting valve body 1 includes a sleeve 2 provided with a valve seat 4, and mounting a main check valve 3 for movement between a normal closed position abutting valve seat 4, and an open position, not shown, spaced from the valve seat 4.

Main check valve 3 has a central bore 5 in which a guide portion 6 of an auxiliary check valve 7 is located so that the auxiliary check valve 7 can move between the illustrated closed position abutting a seat 5a, and an open position, not shown, in which auxiliary check valve 7 is spaced from valve seat 5a. A spring 9, abutting auxiliary check valve 7 and a cover 10 of the supporting valve body 1, urges auxiliary check valve 7 against valve seat 5a, and main check valve 3 against valve seat 4 so that check valve means 3, 7 assumes a normal closed position.

Valve body 1 has an inlet conduit 11, and an outlet conduit 12 including an annular portion surrounding sleeve 2, and communicating with openings 35 in the same. Main check valve 3 has a duct 34 communicating with the annular portion of outlet conduit 12 through openings 35.

Fluid pressure in inlet conduit 11 opens the main check valve 3 and the auxiliary check valve 7 so that a fluid can flow over valve seat 4 and opening 35 into the outlet conduit 12, or over valve seat 5a, openings 34 and 35 into the outlet conduit 12. A flow in the opposite direction from conduit 12 into conduit 11 is not possible since the check valves are held by spring 9 in the illustrated closed position.

Supporting valve body 1 has a central bore 13 in which a push rod 14 is mounted for longitudinal movement. Push rod 14 has one end face whose diameter is sufficiently great so that the end face is located opposite portion 6 of auxiliary check valve 7, and a portion of the main check valve 3. The other end of push rod 14 projects into a cylinder 15 formed in a supporting body 16 which is directly attached to the supporting valve body 1. A piston 17 is mounted for movement in cylinder 15 and has an end face 36 located opposite the corresponding end face of cylinder 15. The other end of piston 17 cooperates with push rod 14, and it is apparent that, if a pressure fluid is supplied through a conduit 33 into the working chamber formed by end face 36, the piston will move to the right as viewed in the drawing for displacing push rod 14 which will first engage the auxiliary check valve 7 and open the same, and then engage the main check valve 3 and open the same against the action of the spring 9. On the other hand, when the pressure in the hydraulic motor 15, 17 is relieved, spring 9 moves the check valves 3 and 7 to the closed position, and correspondingly moves push rod 14 to the left as viewed in the drawing.

The supporting body 16 has a transverse bore 18 which has bore portions of different diameter. The bore portion 27 communicates through conduit 33 with cylinder 15, and is located adjacent a wider bore portion 23. One end of bore 18 is closed by plug 16a, while an adjusting pin 25 is threaded into the other end of bore 18 which is threaded, and held in place by a counter nut, 25a.

A throttle member 19 is located in the bore 18 and has a large throttle portion 21 provided with longitudinal grooves 20 and fitting into bore portion 27. A thin portion 22 of throttle member 19 is located in the wider bore portion 23, and has a hollow interior in which a spring 24 is located which abuts plug 10a for urging throttle member 19 into engagement with the adjusting pin 25. The transition from the wider bore portion 23 to the somewhat narrower bore portion 27 and the grooves 20 forms a throttling means.

A conduit 28 communicates with a conduit 29 in the valve body 1, and is connected to a source of pressure fluid, not shown, which can be connected by a valve, not shown, with conduits 29 and 30. Conduit 28 is not only connected with the bore 18, but also with a duct 30 which communicates with an annular port in the form of a recess 32 in the cylindrical surface 31 of cylinder 15. In the illustrated normal position of the apparatus, when the piston 17 is located at the left end of cylinder 15, piston 17 closes the annular port 32 so that no pressure fluid can flow from conduits 28, 29 and duct 30 into cylinder 15.

During normal operation of the apparatus, when the check valves 3 and 7 are closed by spring 9, as illustrated, a pressure fluid entering inlet conduit 11 raises first the auxiliary check valve 7 from valve seat 5a, and then the main check valve 3 from its valve seat 4 so that the fluid flows over the valve seats 4 and 5a and openings 34, 35 into the outlet conduit 12.

If for a particular reason it is desired that the direction of flow through the valve body 1 is reversed, it is necessary to open the main check valve 3 and the auxiliary check valve 5 so that the fluid can freely flow from conduit 12 through the open check valve and out of conduit 11. For this purpose, check valves 3 and 7 must be held open by push rod 14 against the action of spring 9.

A valve, not shown, is operated so that pressure fluid enters conduits 29 and 28 and flows into the bore 18, and from bore portion 27 and conduit 33 into the working chamber of cylinder 15.

In the bore 18, the fluid flows freely through the wide bore portion 23, but is throttled in the grooves 20 of throttling portion 21 of throttling member 19.

The small flow of pressure fluid entering cylinder 15 acts on end face 36 of piston 17 to displace the same to the right so that piston 17 displaces push rod 14 which engages portion 6 of check valve 7 and opens the same, permitting a reversed fluid flow in outlet conduit 12 to flow through openings 35, 34 into the main check valve 3, over valve seat 5a, and through the central bore 5 into the inlet conduit 11. Due to the throttling effect, the movement of piston 17, pushrod 14, and check valve 7 is slow, and no undesirable pressure surge is produced in outlet conduit 12 where the pressure soon drops.

A short time after the opening of the auxiliary check valve 7, piston 17 arrives in a control position in which its end face 36 uncovers the annular port 32, permitting pressure fluid from conduits 28, 29 to flow through duct 30 into the working chamber of cylinder 15, and since this flow is not throttled, it is much larger than the previous flow and develops high pressure to rapidly move piston 17, and thereby push rod 14 and main check valve 3 so that the latter moves away from valve seat 4, permitting pressure fluid from outlet conduit 12 to flow through openings 35 and over valve seat 4 into inlet conduit 11. This movement is far more rapid than the previous movement, and a larger cross section is opened by main check valve 3 than by the auxiliary check valve 7.

When the source of pressure fluid is disconnected by operation of a valve, not shown, the pressure in the working chamber of the cylinder 15 drops, and spring 9 is effective to move first the auxiliary check valve 7, and then the main check valve 3 to the illustrated normal closed positions, while push rod 14 is displaced to the left and pushes piston 17 in the same direction. During the first part of the movement of the piston 17, a substantial part of the fluid contained in the working chamber of the cylinder is pressed through annular port 32, and duct 30 into conduits 28 and 29. When piston 17 has closed the annular port 32, the remaining fluid in the working chamber is pressed under the action of the spring 9 into the bore portion 27 so that the pressure acting on the throttle portion 21 of throttle member 19 moves the same upward against the action of spring 24 so that the grooves 20 at least partly enter the wide bore portion 23 and the throttling effect is terminated whereby the fluid can now quickly flow back into conduits 28, 29.

When the counter nut 25a is opened, and the threaded adjusting pin 25 turned, throttling member 19 can be moved in one direction by the threaded pin 25, and in the opposite direction by spring 24 so that the position of the throttling portion 21, 20 can be exactly adjusted, resulting in an adjustment of the throttling flow cross section, and consequently in adjustment of the speed at which the piston 17 starts its movement.

Due to the slow opening of the auxiliary check valve 7 before the main check valve 3 is rapidly opened, pressure surges in the conduits upon opening of the check valves are reliably avoided.

It will be understood that each of the elements described above, or two or more together, may also find a useful application in other types of hydraulic apparatus for controlling a check valve differing from the types described above.

While the invention has been illustrated and described as embodied in an apparatus including an auxiliary check valve which is slowly opened, and a main check valve which is rapidly opened, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims. We claim:

1. Check valve controlling hydraulic apparatus, comprising, in combination, biassed check valve means having a normal closed position, and being movable to a fully open position; a hydraulic motor including a cylinder member having an end face, and a piston member having an end face located opposite said end face of said cylinder member, one of said members being movable and connected with said check valve means for moving the same between said closed and open positions; and control means adapted to communicate with a source of pressure fluid, and including first conduit means connected with said cylinder member for supplying a first small flow of pressure fluid into the same for operating said movable member to move slowly from a normal position to a control position so that said check valve means is moved so slowly out of said closed position that a pressure surge cannot occur, said first conduit means opening into said cylinder member in the region of said end face of the same, and second conduit means connected with said cylinder member and being closed in said normal position by said movable member, and opened by the same in said control position for supplying a second large flow of fluid into said cylinder member for moving said movable member rapidly out of said control position to an end position so that said check valve means is moved rapidly to said open position, said second conduit means having a port opening into said cylinder member spaced from said end face of the same so that said end face of said piston member opens said port in said control position thereof.

2. Hydraulic apparatus as claimed in claim 1 wherein said first conduit means include a throttle means so that said small flow of fluid has smaller pressure than said pressure source and said large flow of fluid.

3. Hydraulic apparatus as claimed in claim 2 wherein said throttle means includes a movable throttle part for adjusting the flow cross section of said throttle means; and comprising adjusting means connected with said movable throttle part and operable for adjusting the position of the same.

4. Hydraulic apparatus as claimed in claim 1 wherein said port includes an annular recess in said cylinder member surrounding said end face of said piston in said control position.

5. Hydraulic apparatus as claimed in claim 1 wherein said check valve means include a valve body formed with a conduit having a first valve seat, a first check valve mounted in said conduit movable between a first position engaging said first valve seat and a second position spaced from the same, said first check valve having a second valve seat, a second check valve mounted on said first check valve for movement between a first position engaging said second valve seat and a second position spaced from the same, and spring means biassing said first and second check valves toward said first positions of the same, respectively; wherein said movable member has a normal position spaced from said first and second check valves, and operates said second check valve to move to said second position thereof during movement from said normal position to said control position; and wherein said movable member operates said first check valve during movement from said control position to said end position to move said first check valve to said second position thereof.

6. Hydraulic apparatus as claimed in claim 5 wherein said hydraulic motor includes a push rod for connecting said movable member with said first and second check valves, and being mounted in said valve body for movement with said movable member in one direction for opening said first and second check valves, and for movement with said first and second check valves under the action of said spring means in the opposite direction for returning said movable member to said normal position.

7. Hydraulic apparatus as claimed in claim 1 comprising a supporting body forming said cylinder member and having a bore forming a part of said first conduit means and having a first port communicating with the source of pressure fluid and a second port communicating with said cylinder member, said bore having between said first and second ports a wide bore portion and a narrow bore portion; a throttle member mounted in said narrow bore portion; and having at least one longitudinal throttle groove; and adjusting means connected with said throttle member for moving the same at least partly into said wide bore portion for reducing the throttle effect of said throttle member.

8. Hydraulic apparatus as claimed in claim 7 wherein said adjusting means include a manually operable member threaded into said bore and connected with said throttle member for moving the same between said narrow and wide bore portions.

9. Hydraulic apparatus as claimed in claim 8 wherein said adjusting means include a spring acting on said throttle member urging the same into said narrow bore portion, and wherein said manually operable member abuts said throttle member for moving the same against the action of said spring into said wide bore portion.

10 Check valve controlling hydraulic apparatus, comprising, in combination, biassed check valve means having a normal closed position, and being movable to a fully open position; a hydraulic motor including a cylinder member and a piston member, one of said members being movable and connected with said check valve means for moving the same between said closed and open positions; and control means adapted to communicate with a source of pressure fluid, and including first conduit means connected with said cylinder member for supplying a first small flow of pressure fluid into the same for operating said movable member to move slowly from a normal position to a control position so that said check valve means is moved so slowly out of said closed position that a pressure surge cannot occur, said first conduit means including a bore having a first port communicating with the source of pressure fluid and a second port communicating with said cylinder member, said bore having between said first and second ports a wide bore portion and a narrow bore portion, and second conduit means connected with said cylinder member and being closed in said normal position by said movable member, and opened by the same in said control position for supplying a second large flow of fluid into said cylinder member for moving said movable member rapidly out of said control position to an end position so that said check valve means is moved rapidly to said open position; a throttle member mounted in said narrow bore portion and having at least one longitudinal throttle groove; and a spring in said bore urging said throttle member into said narrow bore portion so that said first small flow is throttled by said throttle groove, and so that in said open position, said large flow moves said throttle member into said wide bore portion whereby said large flow is not throttled.

* * * * *